United States Patent

[11] 3,626,497

| [72] | Inventors | Lucian T. Lambert<br>6004 East 18th St., Tulsa, Okla. 74112;<br>Edward K. Knouse, Jr., 5729 East 26th Pl.,<br>Tulsa, Okla. 74114 |
|---|---|---|
| [21] | Appl. No. | 847,957 |
| [22] | Filed | Aug. 6, 1969 |
| [45] | Patented | Dec. 7, 1971 |

[54] PLASTIC PIPE CLAMP
2 Claims, 3 Drawing Figs.

[52] U.S. Cl. .................................................. 251/8,
24/135, 24/263, 269/249, 269/280
[51] Int. Cl. .................................................. F16k 7/06
[50] Field of Search .......................................... 269/269,
280–283; 24/263 A; 251/4, 6–10

[56] References Cited
UNITED STATES PATENTS

| 2,212,733 | 8/1940 | Grigsby | 251/8 |
|---|---|---|---|
| 3,264,067 | 8/1966 | Alderfer | 251/7 X |
| 3,512,748 | 5/1970 | Wilson | 251/8 |
| 636,971 | 11/1899 | Forcier | 251/8 |
| 2,324,803 | 7/1943 | Snyder | 24/263.3 X |
| 2,485,876 | 10/1949 | Guest | 269/281 X |
| 3,156,444 | 11/1964 | Black | 251/7 |

*Primary Examiner*—M. Cary Nelson
*Assistant Examiner*—Richard Gerard
*Attorney*—Head & Johnson

ABSTRACT: A clamp for shutting off flow through heavy wall plastic pipe utilizes a stationary jaw and a vertically movable jaw carried on a frame. Downward movement of the movable jaw towards the stationary jaw pinches the walls of the pipe placed therebetween without rupture of the pipe. Adapters provide application of the clamp to pipes having diverse outer diameters.

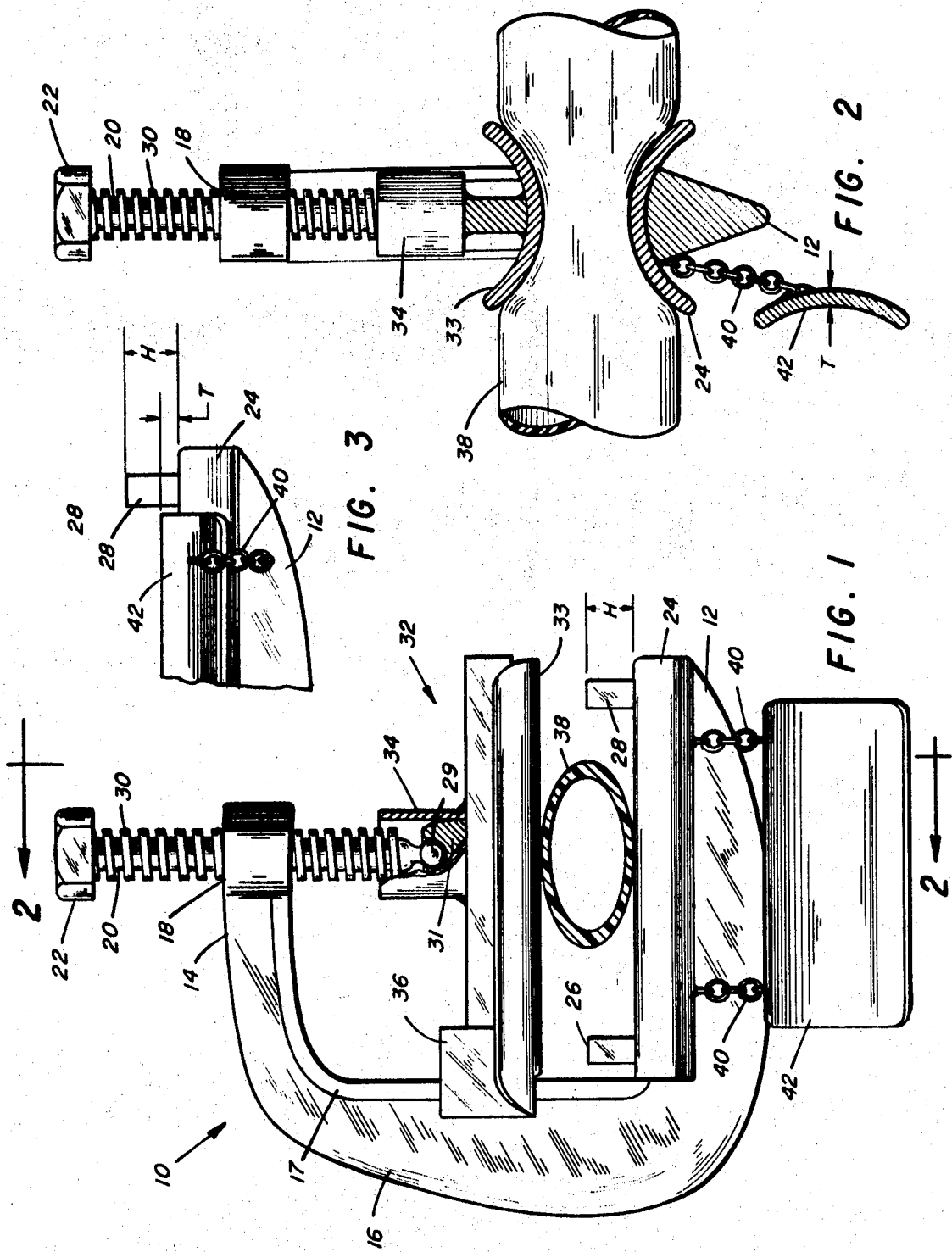

PLASTIC PIPE CLAMP

BACKGROUND OF THE INVENTION

This invention relates to a clamp for shutting off flow through relatively heavy wall plastic pipe. Such pipe is made, for example, of polyethylene, and is in common use in the natural gas pipeline industry. A typical example of such heavy walled pipe is one having 2.375 inches O. D. with a wall thickness of 0.216 inch.

Often it is necessary to shut off flow in a pipe such as when there is a leak therein. The unavailability of a valve upstream from the leak often makes it necessary for the maintenance personnel fixing the pipe to work thereon while flow therethrough is continued. This practice is unacceptable since it always subjects the maintenance personnel to drenching by the fluid escaping from the pipe and in the case where inflammable materials are being transported repair personnel are, in addition, exposed to a substantial fire or explosive hazard.

It is an object of this invention to provide an apparatus which will pinch the wall of plastic pipe to shutoff flow therethrough.

It is a further object of this invention to provide a clamping apparatus for heavy-walled plastic pipe which is operable at any angle of attachment with the pipe.

A still further object of this invention is to provide an apparatus having means thereon which prevent damage to the pipe during operation thereof.

SUMMARY OF THE INVENTION

The invention generally utilizes a C-shaped frame having a stationary jaw carried thereon and having confronting the stationary jaw a movable jaw operable by a threaded shaft which passes through the frame above the stationary jaw. Downward movement of the movable jaw towards the stationary jaw causes the wall of a pipe placed therebetween to collapse thereby stopping flow therethrough; stop members projecting upward from the crown of the stationary jaw obstruct further downward movement of the movable jaw thereby preventing damage to the pipe. Insertable over the stationary jaw intermediate the stop members is an adapter plate which enables the clamp to be used for a pipe size of a diameter different from the size used when the adapter plate is not employed.

GENERAL DESCRIPTION OF THE DRAWINGS

FIG. 1 is a side view of the clamping apparatus of this invention showing a partial cross-sectional view of the attachment of the threaded shaft with the movable jaw which are elements of the invention.

FIG. 2 is a cross-sectional view of the apparatus taken along the line 2—2 of FIG. 1.

FIG. 3 is a side view of the outer extremity of the stationary jaw showing an adapter plate saddled thereover.

DETAILED DESCRIPTION OF THE PREFERRED EMBODIMENT

The clamp, generally denoted as 10, has a C-shaped frame, made of material such as cast iron or steel, consisting of a lower arm 12 and an upper arm 14 connected by a shank 16. A reinforcing rib 17 perpendicularly carried on the inner edge of the frame adds strength thereto.

Axially affixed to the lower arm 12 is an elongated stationary jaw 24, convex in cross section and of material such as cast iron. For the purpose of preventing any rupture in the pipe wall during operation of the clamp by prohibiting puncture of the pipe wall beyond the elastic limit thereof, stop members 26 and 28 of nonpliant material are rigidly attached to and project upwardly from the crown of stationary jaw 24. To accomplish the aforesaid purpose and still allow sufficient pinching of the pipe wall to shutoff fluid flow therethrough, the height (H) of the stop members 26 and 28 (the vertical distance the stop members project upwardly from the crown of stationary jaw 24) should be equal to the "minimum squeeze gap" (MSG) which is printed in manufacturer's data bulletins for a particular size of pipe. Mathematically, H=MSG. For example, *Du Pont Technical Bulletin* 661 *on Aldyl—A Polyethene Pipe* lists the "minimum squeeze gap" (MSG) for pipe having an O. D. of 2.375 inches as 0.325 inch. Hence, for a clamp which is to be employed with a pipe having and O. D. of 2.375 inches, the height (H) of the stop members would be 0.325 inch. Heights of the stop members for clamps for other size diameter pipes can likewise be determined from the appropriate manufacturer's pipe data sheets.

The upper arm 14 of the frame includes at the outer end thereof a transverse threaded aperture 18 through which passes a shaft 20 having thereon along substantially the longitudinal length thereof square threads 30. At the upper end of threaded shaft 20 is a hex nut 22 to cause rotation thereof. The hex nut 22 is of a size common in the industry and is designed to be operated by a ratchet-type wrench which is carried by most maintenance personnel as one of their standard tools.

Projecting downwardly from the lower end of shaft 20 is a ball 29 which is swivelly received in the recess of a ball joint receptacle 31 welded to a movable jaw 32, thereby providing swivelable attachment of the movable jaw 32 to the shaft 20.

Welded to the movable jaw 32 and projecting upwardly therefrom is a guide tube 34 which encircles receptacle 31. The inner opening of the guide tube 34 is slightly larger than the outer diameter of the square threads 30 and covers three or four of the threads 30 thereby assuring horizontal alignment of the movable jaw 32 with the stationary jaw 24 and impeding wobble of the movable jaw 32.

Movable jaw 32 includes a pipe engagement segment 33 concave in cross section and in facing relationship with stationary jaw 24. Travel of movable jaw 32 towards or away from stationary jaw 24 is caused by proper rotary movement of shaft 20. Extending outwardly from the movable jaw 32 is a guide bracket 36 having juxtaposed walls curved to slidably receive the rib 17 in such a manner that the movable jaw member 32 will not rotate when the shaft 20 is turned. Consequently the stationary jaw 24 and the movable jaw 32 are always in vertical alignment.

In operation a pipe 38, through which flow is to be shutoff, is placed intermediate the jaws 24 and 32. A ratchet-type wrench engaged in the hex nut 22 imparts clockwise rotation of the shaft 20 which moves the movable jaw 32 downwardly towards stationary jaw 24 thereby pinching the wall of pipe 38. The curvature of the jaws and the swivelable attachment of movable jaw 32 with shaft 20 assure proper squeeze on the pipe without horizontal alignment being a crucial factor and prevent damage to the pipe walls. Once the pipe engagement segment 33 of the movable jaw makes contact with the upper end of stop members 26 and 28 further downward movement of movable jaw 32 is prohibited. At such time the wall of the pipe 38 is pinched sufficient to shutoff liquid flow through pipe 38 but, due to the specified height of the stop members, will not have ruptured.

When the pipe has been repaired, flow through the pipe 38 can be restored by receding the movable jaw 32 from the stationary jaw 24 in an obvious manner.

The clamp as described can be employed only on pipes having the same outer diameter; this limitation is imposed by the specific height of the stop members 26 and 28 which is directly determined from the technical data of a pipe having a particular size outer diameter (O. D.); that is, the height of the stop members is equal to the "minimum squeeze gap" (MSG), which varies with the size of the pipe. Versatility can be added to the clamp by an adapter plate 42 which is attached to lower arm 12 of the frame by flexible chains 40 and which is convexly arcuate in cross section so as to be saddleable over stationary jaw 24 intermediate the stop members 26 and 28 to enable the clamp to shutoff liquid flow through a second pipe having a different outer diameter. In order for the stop members 26 and 28 to perform the function of preventing puncture of the walls of the second pipe beyond the elastic limits thereof, the vertical distance between the upper end of the stop members 26 and 28 and the crown of the adapter plate when saddled over the stationary jaw 24 must be equal to the "minimum squeeze gap" ($MSG_1$) of the second pipe as specified in the pipe manufacturer's technical data bulletin. Thus, the thickness (T) of the adapter plate 42 at the crown thereof is equal to the height (H) of the stop members 26 and 28 minus the "minimum squeeze gap" ($MSG_1$) of the second pipe. Mathematically, $T=H-MSG_1$. As for example, *Dupont Technical Bulletin* 661 *on Aldyl—A Polyethene Pipe* lists the "minimum squeeze gap" ($MSG_1$) for pipe having an O. D. of 1.315 inches as 0.180 inch. Hence, the thickness (T) of an adapter plate for such a pipe for use with a clamp having stop bars of a height (H) of 0.325 inch would be:

$T=H-MSG_1$
$T=0.325$ inch $- 0.180$ inch
$T=0.145$ inch.

Obviously, more than one adapter plate can be attached to and used in conjunction with a single clamp.

During the detailed description of this invention, specific terminology has been utilized for the sake of clarity; however, it is to be understood that the words used include all technical equivalents which operate in a similar manner to accomplish a similar purpose.

As can easily be seen, the overall design requirements of the clamp permit operation at any angle and the clamp can easily be used around buried pipe where there often are various obstructions with a minimum of excavation. Consequently, there is a considerable savings of time in obtaining shutoff conditions under emergency circumstances.

What is claimed:

1. A clamp for shutting off flow through heavy wall plastic pipe such as polyolefin type comprising:
   a C-shaped frame having a lower arm and an upper arm coupled by a shank, said upper arm being opposed to said lower arm and containing transversely therethrough a threaded aperture;
   an elongated shaft, threaded along substantially the length thereof, rotatably engaged in said threaded aperture of said upper arm and having at the upper end thereof means to effect said rotation;
   an elongated stationary jaw, the working face being curved convex in cross section, axially carried on said lower arm;
   a vertically movable jaw swivelly connected to the lower end of said shaft and including as an integral part thereof:
   a pipe engagement segment, the working face being curved convex in cross section relative to facing relationship with said convex stationary jaw;
   a guide tube, slightly larger than the outside diameter of said elongated shaft, attached to said movable jaw and projecting upwardly therefrom to encircle at least three of said threads on the lower portion of said shaft;
   said stationary jaw having at each end thereof straight faced stop members protruding upwardly from the crown thereof to stop the downward movement of said movable jaw, said members being of a height equal to about the minimum squeeze gap of a pipe to prevent rupture thereof during operation of said clamp;
   means on said movable jaw to guide same along said shank of said frame and to maintain said jaws in alignment toward each other.

2. A clamp for shutting off flow through heavy wall plastic pipe such as polyolefin type comprising:
   a C-shaped frame having a lower arm and an upper arm coupled by a shank, said upper arm being opposed to said lower arm and containing transversely therethrough a threaded aperture;
   an elongated shaft, threaded along substantially the length thereof, rotatably engaged in said threaded aperture of said upper arm and having at the upper end thereof means to cause said rotation;
   an elongated stationary jaw, the working face being curved convex in cross section, axially carried on said lower arm,
   a vertically movable jaw swivelly connected to the lower end of said shaft and including as an integral part thereof:
   a pipe engagement segment, the working face being curved convex in cross section relative to facing relationship with said convex stationary jaw;
   a guide tube, attached to said movable jaw, projecting upwardly therefrom to encircle the lower portion of said shaft;
   said stationary jaw having at each end thereof straight faced stop members protruding upwardly from the crown thereof to stop the downward movement of said movable jaw, said members being of a height equal to about the minimum squeeze gap of a pipe to prevent rupture thereof during operation of said clamp;
   means on said movable jaw to guide same along said shank of said frame and to maintain said jaws in alignment toward each other; and
   an adapter plate curved to substantially conform to the outer curvature of said stationary jaw and insertable over said stationary jaw intermediate said stop members and connected to said lower arm by flexible means.

* * * * *